J. A. DAVIS.
ANTISLIPPING ATTACHMENT FOR HORSESHOES.
APPLICATION FILED SEPT. 6, 1912.
1,097,616.
Patented May 26, 1914.
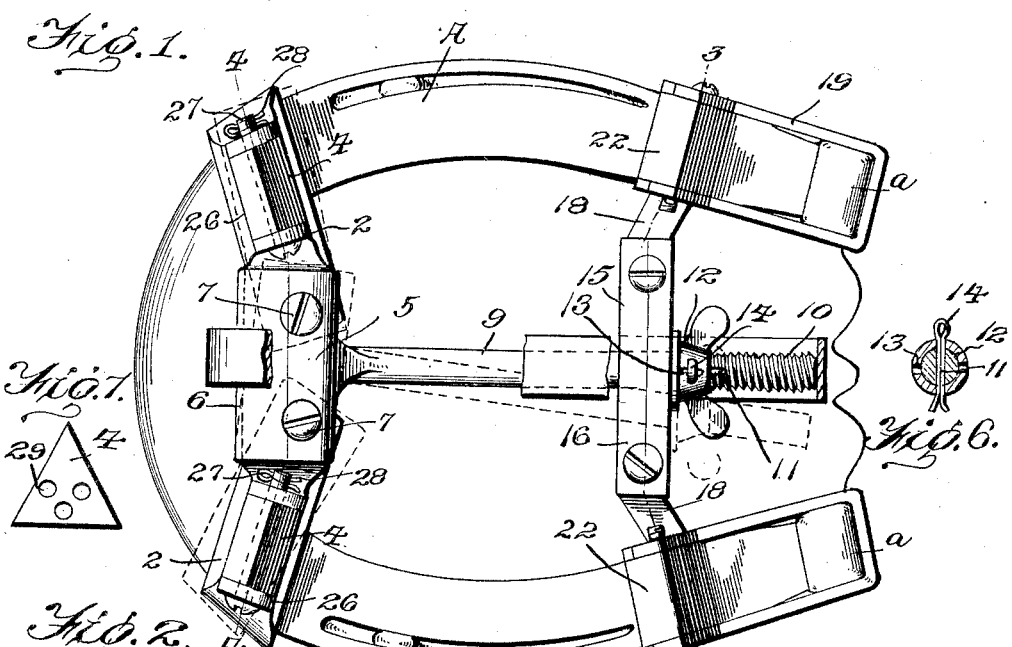
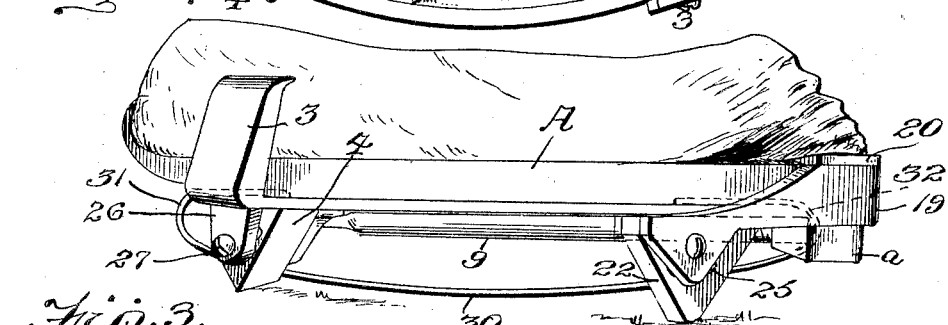
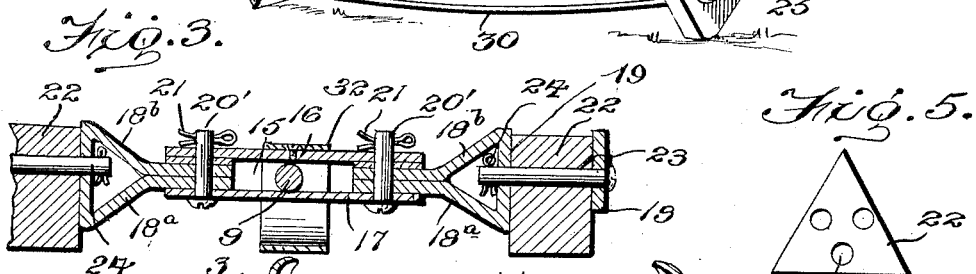
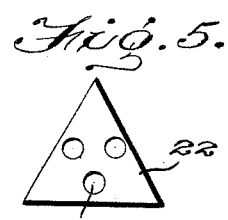
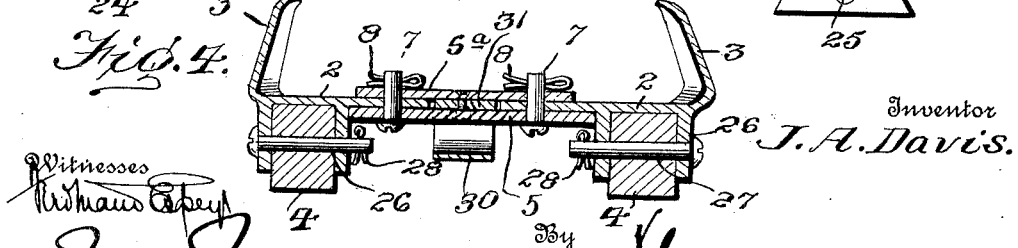
Inventor
J. A. Davis.

UNITED STATES PATENT OFFICE.

JAMES A. DAVIS, OF WASHINGTON, DISTRICT OF COLUMBIA.

ANTISLIPPING ATTACHMENT FOR HORSESHOES.

1,097,616.

Specification of Letters Patent. Patented May 26, 1914.

Application filed September 6, 1912. Serial No. 719,020.

*To all whom it may concern:*

Be it known that I, JAMES A. DAVIS, citizen of the United States, residing at Washington, District of Columbia, have invented certain new and useful Improvements in Antislipping Attachments for Horseshoes, of which the following is a specification.

My invention relates to horse shoes and particularly to a calk supporting attachment for horse shoes designed when used to prevent the slipping of the shoe upon icy pavements or roads.

The primary object of my invention is the provision of a simple, cheap and effective device whereby the calks may be removably supported upon a horse shoe, and a further object in this connection is to so mount the calks that they may be readily removed and replaced when desired.

A further object is to so construct the attachment that it may be tightened upon the horse shoe and when so tightened will not act either to expand or contract the shoe and will not therefore tend to laterally compress or expand the horse's hoof.

A further object is to so form the attachment that the tightening strain will be exerted longitudinally along the shoe and not transversely thereof.

A further object is to so form the attachment that it will not be forced against the frog when in position.

A further object is to so form the attachment that it will conform to the shape of the hoof and thus be adjustable to hoofs which are more or less irregular in shape.

My invention is illustrated in the accompanying drawings, wherein,

Figure 1 is an underside plan view of a horse shoe with my attachment applied thereto. Fig. 2 is a side elevation of the attachment applied to a hoof. Fig. 3 is a transverse vertical section through the attachment on the line 3—3 of Fig. 1. Fig. 4 is a transverse section on the line 4—4 of Fig. 1. Fig. 5 is a side elevation of one of the calks detached. Fig. 6 is a cross sectional view through the nut 12, the cotter pin and the bolt 9. Fig. 7 is a side elevation of one of the calks of my horseshoe detached from the shoe itself.

Referring to these drawings A designates a horse shoe of any ordinary or usual form and provided with heel calks *a*.

My improved attachment includes clamping members 2 having angularly bent terminal ends 3 which are curved slightly inward so as to engage with the hoof, as illustrated in Fig. 2. Each of these members 2 carries upon it calks 4, which calks are mounted in a manner to be hereinafter stated. The members 2 are pivotally connected to a plate 5, which plate has an angularly bent edge 6. The pivotal connection between the members 2 and the plate 5 is secured by means of pins 7 which extend upward through a plate 5ª, through the members 2 and through the plate 5 and are provided at their upper ends with transverse perforations for the reception of cotter pins 8. The lower ends of the pins 7 are headed. It will be seen that the flange 6 on the plate 5 forms a stop, limiting to some extent, the outward movement of the members 2.

Extending rearward from the plate 5 and preferably formed as the part of the plate is a tightening rod 9 whose rear end is screw threaded as at 10. This rear end is preferably slotted as at 11. A wing nut 12 engages the screw threaded portion 10 and this nut is perforated, as illustrated in Fig. 6 with passages extending at right angles, these passages being designated 13. A cotter pin 14 is adapted to be inserted through these passages for the purpose of holding the nut in any adjusted position.

Loosely mounted upon the tightening rod 9 is a yoke 15, this yoke, as illustrated in Fig. 3, being formed of upper and lower plates 16 and 17. The tightening rod 9 passes loosely between these plates 16 and 17 so that the tightening rod may be laterally shifted to one side or the other of a median line, as illustrated in dotted lines in Fig. 1.

Pivotally connected to each end of the yoke 15 are links 18 which carry rearwardly extending U-shaped members or loops designated 19 which extend over the heel calks *a* when the attachment is in place, as illustrated in Figs. 1 and 2. The rear end of each loop 19 is closed at its top by a plate 20. This plate, when the loop is in position, extends between the heel of the shoe and the adjacent portion of the hoof, preventing any depression of the loop relative to the adjacent end of the shoe. Preferably each loop 19 is made integral with the link which connects the loop with the yoke 15 and preferably each link is formed as illustrated in Fig. 3, that is, with upper and lower members 18ᵇ and 18ª. The member 18ᵇ extends outwardly from the side of the loop 19 at its upper edge, while the member 18ª extends outwardly from the side of the loop 19 at its lower edge, the members 18 and 18ª converging and the ends of said members either being welded together or pressed together and inserted between the members 16 and 17 of the yoke. To pivotally connect the links 18 to the yoke, I provide vertically disposed pins 20' headed at their lower ends and perforated at their upper ends for the passage of cotter pins 21. This construction permits the links to be detached from the yoke.

As before observed the loops 19 are U-shaped and disposed between the open end of each loop is a triangular calk 22. Each loop 19 is slightly wider than the heel end of the shoe, and hence fits against the sides of the horse shoe. The calk 22 is disposed slightly below the upper edges of the forwardly extending ends of the corresponding loop, so that the upper face of the calk will be held firmly against the bottom face of the shoe. Each heel calk 22 is preferably held in place by a pin 23 which extends through the side plates of the loop 19, the end of the pin being formed with a perforation for the reception of a cotter pin 24. It will be seen that the purpose of forming the links 18 with converging portions as illustrated in Fig. 3 is to accommodate the pin 24 and permit the pin to be readily removed or replaced.

The calk 22 as before stated is triangular in form so as to provide three bearing faces and three cutting edges and it is also preferably provided with three transverse perforations 25, through any one of which the pin 23 may pass. These perforations 25 are so disposed that when the pin 23 is passed through one of the perforations 25 there will be a horizontal bearing face and a downwardly extending cutting edge. By providing three perforations 25 it is possible to remove a worn calk, rotate the calk and replace it so as to present an unworn cutting edge to the ground. It is also possible to remove the calk entirely and replace it by an entirely new calk. The front calks 4 may be riveted to the members 2 or may have screw threaded engagement with these members but preferably they are supported by providing downwardly projecting lugs 26 on each of the members 2 and providing a transverse pin 27 which extends through these lugs and through the calk and which is held in place by a cotter pin 28. Each calk 4 is preferably triangular in section so as to present a flat bearing face to the member 2 and a sharp edge to the ground and each calk is preferably provided with three perforations 29 through any one of which the pin 27 may pass, thus permitting the calk to be rotated so as to present a new cutting edge to the ground when the old cutting edge is worn away.

In attaching my device to a horse shoe the clamping members 2 are first engaged with the shoe on each side of the toe and loops 19 are disposed over the heel of the shoe in the manner shown in Fig. 1. The loops 19 and the members 2 being pivotally connected to the tightening rod 9 and to the yoke 15, adjust themselves to any peculiar form of shoe. The nut 12 is then tightened up, drawing the inner ends of the clamping members 2 rearward and drawing the loops 19 forward. The strain of the tightening rod 9 is exerted longitudinally upon the shoe and not transversely and hence there is no transverse strain placed upon the shoe which would tend to compress the shoe or expand the same, at the same time the clamping action acts to force the inwardly turned ends of the jaws 3 into engagement with the hoof so that the attachment cannot be pulled off at its forward end. The plates 20 prevent the rear ends of the attachment from being disengaged from the shoe.

If all hoofs were regular in form, it would not be necessary that the clamping rod 9 should be laterally shiftable, but I find in practice, that it is necessary to make provision for irregularities in contour, and this is the reason why I so form the yoke 15, that the clamping rod 9 may have a lateral adjustability relative to the yoke. An attachment which is not adjustable in this regard can only be used on perfectly regular hoofs, but I have found in practice, that my device is capable of being used on hoofs which greatly vary from the regular form. It will also be noted that the heel calks 22 are held in proper position, transverse to the horns of the shoe and that these heel calks cannot get out of place. Furthermore it will be seen that these heel calks cannot rotate when the attachment is in place on a shoe for the reason that the base of each calk will be pressed firmly against the face of the shoe.

While I have illustrated what I deem to be the best form of my invention and one which I have found to be thoroughly effective in practice, I wish it understood that I do not wish to be limited to the details illustrated, but that I may vary the construction in many ways without departing from the spirit of the invention.

While I have shown the calks as being triangular in form, it will, of course, be understood that I may use calks having flat bearing faces instead of sharp bearing faces, and that these flat calks may be interchangeable with the sharp edged calks. These flat calks may be used for ordinary work and may be used for the purpose of lengthening the life of the shoe. Thus when the shoe becomes old and thin, my attachment may be applied to the shoe and inasmuch as all wear will be borne by the calks of the attachment and not by the shoe, the old shoe will last comparatively a long while.

It will be seen that the attachment may be readily applied and readily detached, and that thus it is capable of being used under a variety of circumstances, and that thus the horses may be "sharp shod" whenever necessary without the necessity of having the sharp calks remain in place when there is no need for them.

As before stated, my attachment, by reason of its peculiar structure, is adapted to be used where the shape of the hoof is irregular. It is also adapted to be used where one horn of the shoe is longer than the other. Horses are often shod in this manner and my attachment is also so constructed that it will adapt itself to any peculiar formation of the shoe.

This attachment may remain attached to the hoof for an indefinite period, without injury to the hoof in any manner and may be used simply for the purpose of taking all wear from the shoe proper. The body of the attachment may be used for an indefinite period and as all wear comes upon the calks, it will only be necessary to replace the calks when worn with new calks which can be readily done without taking the attachment from the hoof.

In order to prevent snow from balling up in the horse's hoof, I provide a relatively wide flat spring designated 30. The ends of this spring are rebent at 31 and 32 as shown in dotted lines in Fig. 2, the reflexed ends of the spring being attached to the plates 16 and 5ª by means of rivets or like devices. This spring 30 extends beneath the tightening rod 9 but does not project down as far as the points of the calks 4 and 22. The rebent ends permit the spring to be flexed and when the pressure upon the hoof is released, the spring will return to its original form throwing out any "ball" which may have accumulated on the hoof.

Having thus described the invention, what is claimed is:

1. An attachment for horseshoes comprising a tightening rod, oppositely disposed diverging toe clamps pivotally connected to the forward end of the rod, a yoke having an elongated opening through which the rear end of the tightening rod passes, said yoke being thus adjustable laterally with relation to the tightening rod, looped heel engaging members having portions extending into the space between the ends of said yoke, pivot pins detachably connecting said extensions with the ends of the yoke, and calks mounted upon said clamping members and the heel engaging members.

2. An attachment for horse shoes, comprising a tightening rod, screw threaded at its rear end and having a transversely extending plate at its forward end, angular toe clamps pivoted to the ends of said plate, a yoke formed of spaced bars between which the tightening member passes, a nut on the tightening member, U-shaped heel engaging members pivotally connected to the opposite ends of the yoke, and calks mounted upon the toe clamps and the heel engaging members.

3. An attachment for horse shoes comprising a tightening rod having a widened forward end formed with a transverse flange, a pair of angular toe clamps pivoted to the ends of said widened portion, a yoke comprising spaced plates through which yoke the rear end of the tightening rod passes, a nut on the tightening rod engaging said yoke, oppositely disposed diverging rearwardly extending U-shaped members pivotally connected to the ends of the yoke, and adapted to engage the rear ends of the horse shoe, each U-shaped member being formed with a plate closing the upper end of the loop formed by said U-shaped member, and calks mounted upon the toe clamps and upon said U-shaped members.

4. A horseshoe attachment comprising flat faced calk supporting members, pairs of lugs supported from the calk supporting members and spaced from each other and extending at right angles to the flat face thereof, and many sided calks supported between the lugs, one side of the calk resting against the flat face of the supporting member, each calk being rotatably adjustable between the lugs whereby to bring any one of the sharp edges of each calk into active position.

5. An attachment for horse shoes comprising a tightening rod, oppositely disposed diverging toe clamps pivotally connected to the forward end of the rod, a yoke comprising spaced bars through which the rear end of the tightening rod passes and within which the tightening rod is laterally adjustable, the screw threaded end of said tightening rod being longitudinally slotted, a nut on the tightening rod, a pin passing through the slot thereof and through the nut to hold the nut in its adjusted position, heel engaging members pivotally connected to the ends of said yoke and calks mounted upon said clamping members and the heel engaging members.

6. An attachment for horse shoes comprising a tightening rod, a pair of angular toe clamps pivotally connected to the forward end of the tightening rod, a yoke comprising spaced plates between which the rear end of the tightening rod passes, a nut on the tightening rod engaging said yoke, rearwardly extending U-shaped members adapted to engage the rear ends of the horse shoe, links formed integral with said U-shaped members and disposed at the forward ends thereof, each link composed of upper and lower converging members, the inner ends of which are pivotally connected between said yoke plates, calks mounted upon the toe clamps, calks rotatably mounted upon the heel engaging members at the forward ends of the same, a pin passing through each heel engaging member and through the corresponding calk, and a cotter pin passing through said first named pin and disposed between the diverging portions of the link.

In testimony whereof I affix my signature in presence of two witnesses.

JAMES A. DAVIS. [L. S.]

Witnesses:
FREDERIC B. WRIGHT,
J. D. YOAKLEY.

Copies of this patent may be obtained for five cents each, by addressing the "Commissioner of Patents, Washington, D. C."